(12) United States Patent
Kobayashi

(10) Patent No.: US 10,757,409 B2
(45) Date of Patent: Aug. 25, 2020

(54) METHOD FOR CONTROLLING INFORMATION PROCESSING DEVICE AND INFORMATION PROCESSING DEVICE

(71) Applicant: SEIKO EPSON CORPORATION, Tokyo (JP)

(72) Inventor: Toshiya Kobayashi, Sapporo (JP)

(73) Assignee: SEIKO EPSON CORPORATION, Tokyo (JP)

( * ) Notice: Subject to any disclaimer, the term of this patent is extended or adjusted under 35 U.S.C. 154(b) by 93 days.

(21) Appl. No.: 15/987,338

(22) Filed: May 23, 2018

(65) Prior Publication Data

US 2018/0352227 A1    Dec. 6, 2018

(30) Foreign Application Priority Data

May 30, 2017    (JP) .................................. 2017-106274

(51) Int. Cl.
*H04N 19/12*    (2014.01)
*G06T 11/20*    (2006.01)
*G06T 11/60*    (2006.01)

(52) U.S. Cl.
CPC .............. *H04N 19/12* (2014.11); *G06T 11/20* (2013.01); *G06T 11/60* (2013.01)

(58) Field of Classification Search
CPC .......... G06T 11/20; G06T 11/60; H04N 19/12
See application file for complete search history.

(56) References Cited

U.S. PATENT DOCUMENTS

| | | | |
|---|---|---|---|
| 2008/0192283 A1 | 8/2008 | Kobayashi | |
| 2010/0057761 A1* | 3/2010 | Nolhage | ............. G06F 3/04845 707/E17.009 |
| 2015/0019960 A1 | 1/2015 | Kobayashi et al. | |

FOREIGN PATENT DOCUMENTS

| | | |
|---|---|---|
| JP | 2008-199340 A | 8/2008 |
| JP | 2015-18352 A | 1/2015 |
| JP | 2016-157201 A | 9/2016 |

* cited by examiner

*Primary Examiner* — Ruiping Li
(74) *Attorney, Agent, or Firm* — Oliff PLC

(57) ABSTRACT

A method for controlling an information processing device includes: accepting an operation on an image before editing; editing the image before editing, based on the accepted operation; comparing data of the image before editing with data of an image after editing obtained by editing the image before editing; and storing history information about the editing if a difference between the image before editing and the image after editing is detected as a result of the comparison.

12 Claims, 6 Drawing Sheets

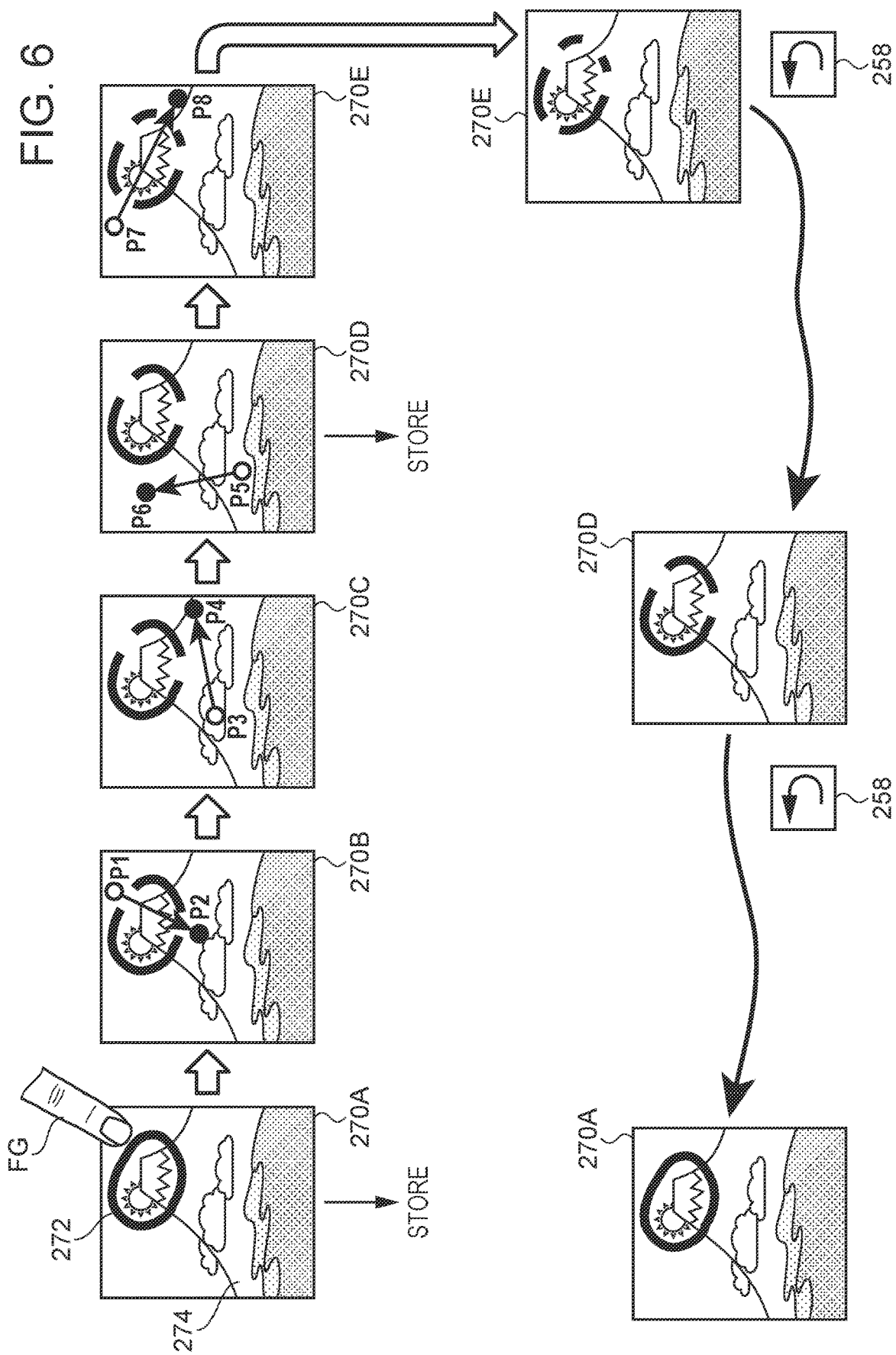

METHOD FOR CONTROLLING INFORMATION PROCESSING DEVICE AND INFORMATION PROCESSING DEVICE

BACKGROUND

1. Technical Field

The present invention relates to a method for controlling an information processing device and an information processing device.

2. Related Art

According to the related art, a device or software for drawing an image based on a drawing operation by a user is known, as disclosed in JP-A-2015-18352.

With such a device or software, drawing operations by the user are sequentially stored in a storage resource as history information. Based on a return operation by the user, a previous image before a drawing operation is carried out can be sequentially restored. This enables the user to cancel an operation error retrospectively in time series by carrying out a return operation, even if the user has carried out an erroneous drawing operation.

However, with the related-art device or software, even a drawing operation that does not change the present image is stored as history information. Therefore, when carrying out a drawing operation and subsequently returning to a desired image by return operations, the user needs to carry out return operations including those for the history information with the unchanged image. This is troublesome to the user.

SUMMARY

An advantage of some aspects of the invention is that an operation that goes back in time series based on history information that is efficiently stored can be carried out efficiently.

The invention can be implemented as the following forms or application examples.

Application Example 1

A method for controlling an information processing device according to this application example includes: accepting an operation on a first image; editing the first image, based on the accepted operation; comparing first image data representing the first image with second image data representing a second image obtained by editing the first image; and storing history information about the editing if a difference between the first image data and the second image data is detected as a result of the comparison.

With such a method, if a difference between the first image data and the second image data obtained by editing the first image based on an operation on the first image is detected when these image data are compared, the history information about the editing is stored. Since the history information is stored when the image is changed by editing, the history information can be stored efficiently and a history operation can be carried out with efficient use of the stored history information.

Application Example 2

In the method for controlling an information processing device according to the application example, it is preferable that the history information is erased in order from the earliest stored history information, if an amount of information of the stored history information exceeds a reference amount.

With such a method, if the amount of information of the stored history information exceeds a reference amount, the history information is erased in order from the earliest stored history information. Therefore, an increase in the storage capacity can be restrained and the storage resource can be efficiently used.

Application Example 3

In the method for controlling an information processing device according to the application example, it is preferable that the first image data is compressed by a predetermined compression method to generate first compressed data, that the second image data is compressed by the predetermined compression method to generate second compressed data, and that the first compressed data is compared with the second compressed data.

With such a method, the first image data and the second image data are compressed by the predetermined compression method and then compared with each other with their data volume thus reduced. Thus, these image data can be compared swiftly.

Application Example 4

In the method for controlling an information processing device according to the application example, the predetermined compression method may be a lossless compression method.

Application Example 5

In the method for controlling an information processing device according to the application example, it is preferable that the history information includes the first compressed data compressed by the lossless compression method.

With such a method, the first compressed data is compressed by the lossless compression method. Therefore, the first image before the compression can be restored from the history information.

Application Example 6

In the method for controlling an information processing device according to the application example, it is preferable that the first image data and the second image data are compressed by a lossy compression method, that the first compressed data and the second compressed data thus compressed are compared with each other, that the first image data is compressed by a lossless compression method if the difference is detected as a result of the comparison, and that the history information including the first compressed data compressed by the lossless compression method is stored.

With such a method, the first image data and the second image data that are compressed by the lossy compression method are compared with each other. The first image data is compressed by the lossless compression method if the difference is detected. The compressed first image data is stored as the history information. Thus, the processing time required to detect the difference can be reduced. Also, since the first image data is compressed by the lossless compression method and then stored as the history information, the first image before the compression can be restored from the history information.

Application Example 7

In the method for controlling an information processing device according to the application example, it is preferable that the first image data and the second image data are transmitted to a display device.

With such a method, the first image and the second image can be displayed by the display device.

Application Example 8

An information processing device according to this application includes: an accepting unit which accepts an operation on a first image; an editing unit which edits the first image, based on the accepted operation; a storage unit which stores history information about the editing; a comparison unit which compares first image data representing the first image with second image data representing a second image obtained by editing the first image; and a management unit which causes the storage unit to store the history information if the comparison unit detects a difference between the first image data and the second image data.

With such a configuration, if a difference between the first image data and the second image data obtained by editing the first image based on an operation on the first image is detected when these image data are compared, the history information about the editing is stored. Since the history information is stored when the image is changed by editing, the history information can be stored efficiently and a history operation can be carried out with efficient use of the stored history information.

BRIEF DESCRIPTION OF THE DRAWINGS

The invention will be described with reference to the accompanying drawings, wherein like numbers reference like elements.

FIG. 6 shows an example of editing processing based on the drawings program.

DESCRIPTION OF EXEMPLARY EMBODIMENTS

Hereinafter, an embodiment of the invention will be described with reference to the drawings.

Embodiment

Figure 1:
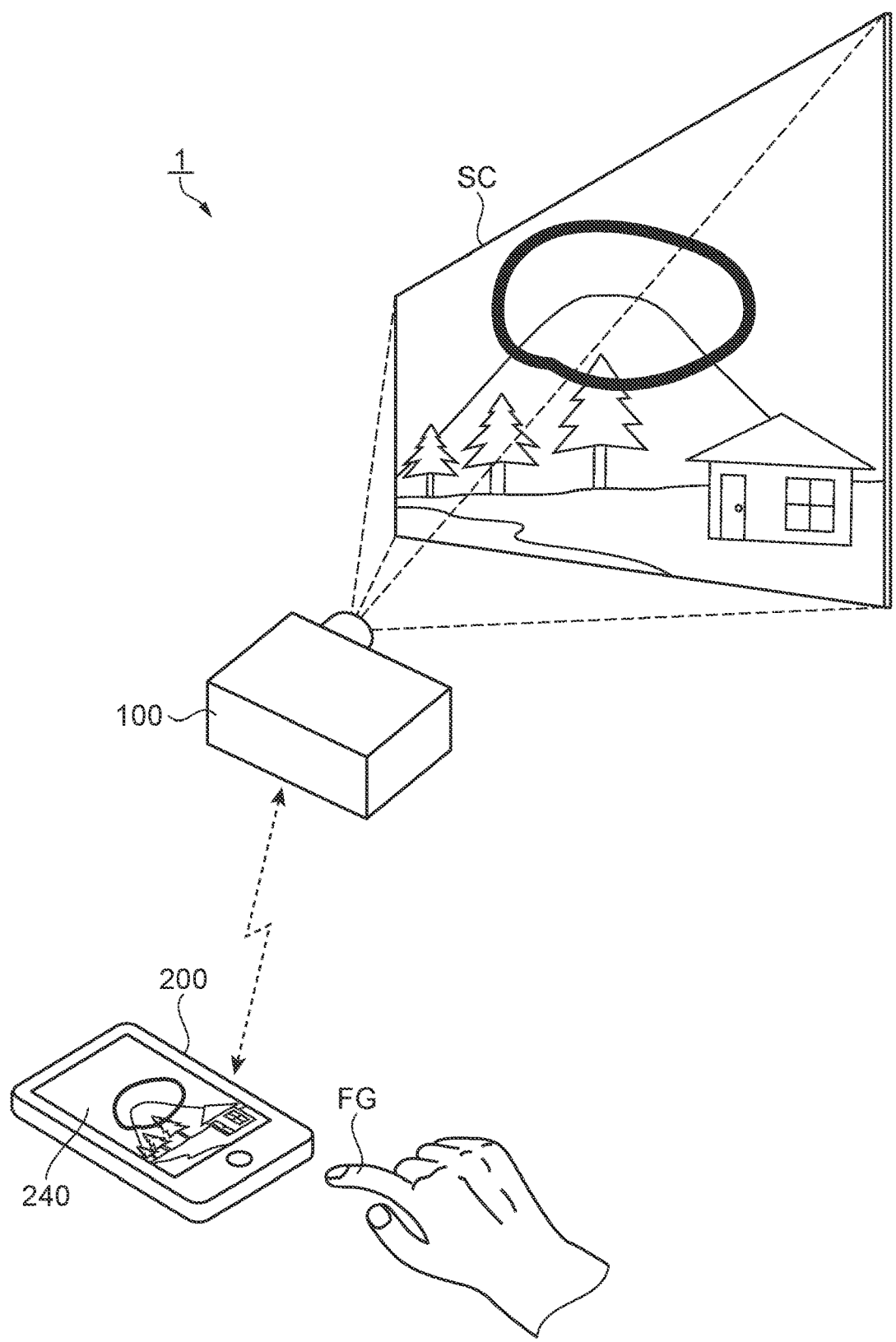
FIG. 1 shows a schematic configuration of a display system.

A display system 1 according to an embodiment will be described below with reference to the drawings.
Outline of Display System FIG. 1 shows a schematic configuration of the display system 1. The display system 1 includes an information processing device 200, and a projector device 100 as a display device.

The information processing device 200 and the projector device 100 are connected together in such a way as to be able to transmit and receive various data via wireless communication. The projector device 100 and the information processing device 200 are connected according to protocols of a predetermined wireless communication method and can transmit and receive data via communication.

The information processing device 200 is a small information terminal which the user holds in a hand and operates. For example, a high-function mobile phone such as a smartphone, or a multi-function mobile terminal such as a tablet terminal or PDA (personal digital assistant) may be employed. The information processing device 200 detects that a user interface screen 250 (FIG. 4) displayed on a touch panel 240 is touched by a user's finger, and executes a predetermined function associated with the touched area.

Figure 2:
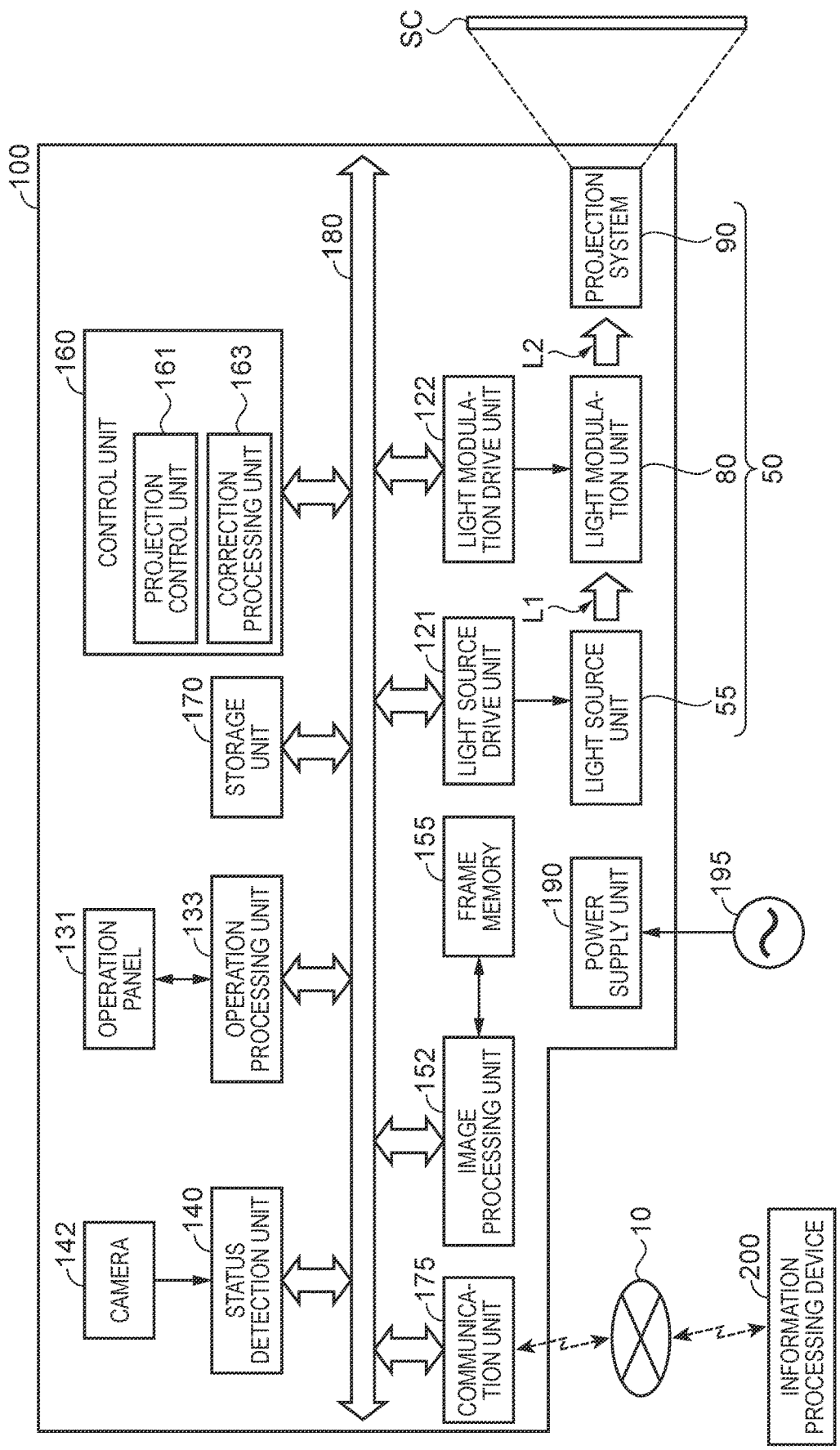
FIG. 2 shows the functional configuration of a projector device.
Figure 4:
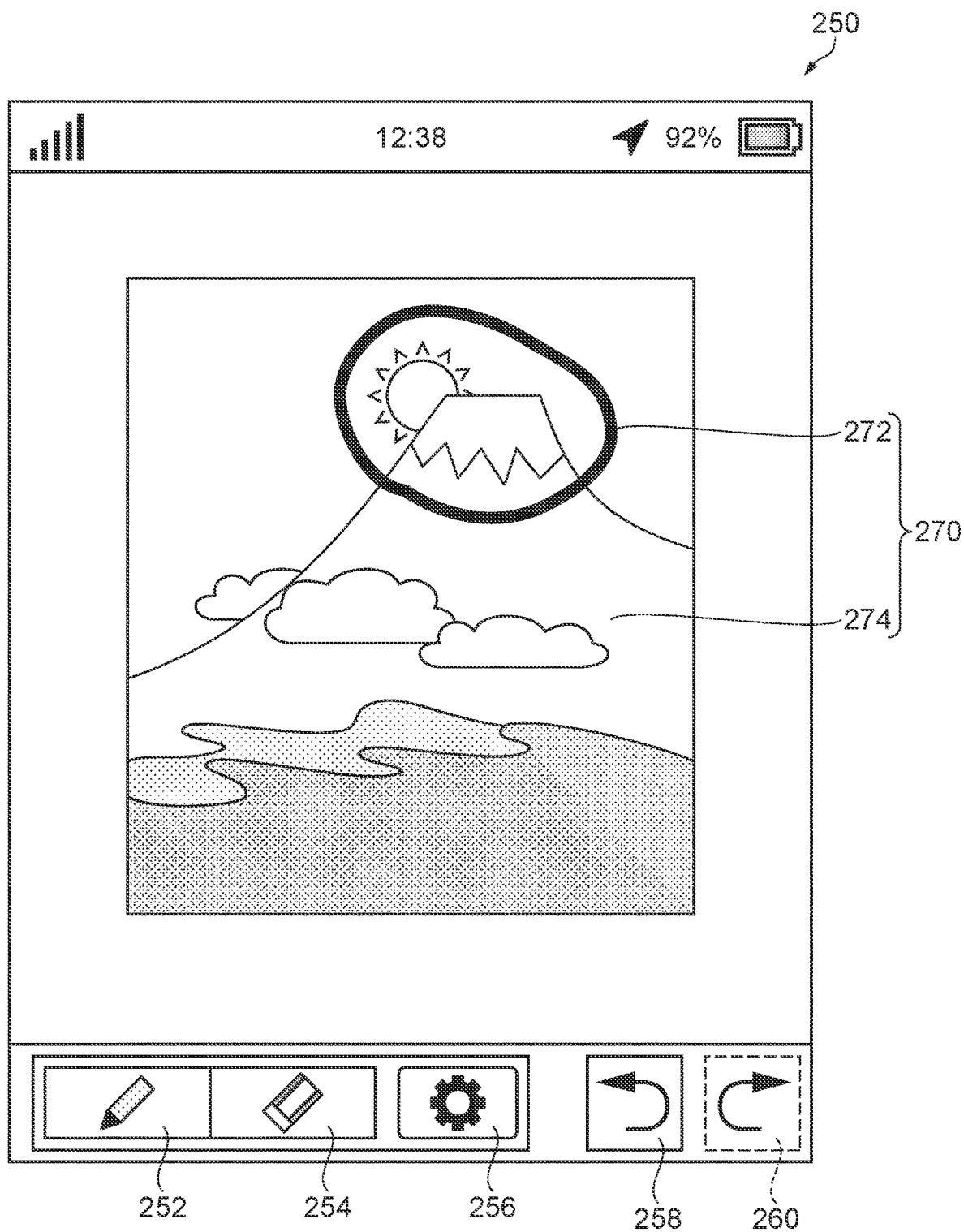
FIG. 4 shows an example of a user interface screen of a drawing program.

For example, in FIG. 1, the information processing device 200 is executing a drawing program. The drawing program allows the user to operate a pen, brush, eraser or the like provided as a user interface, thus generating or erasing a desired drawn image 272 (FIG. 4). The drawing program then generates a composite image made up of the generated or erased drawn image superimposed on an image displayed on the touch panel 240, and displays the generated composite image. The information processing device 200 also transmits image data of the composite image displayed on the touch panel 240, to the projector device 100. The projector device 100 receives the image data and projects the same image as the composite image displayed on the touch panel 240, onto a screen SC.
Functional Configuration of Projector Device FIG. 2 shows the functional configuration of the projector device 100.

The projector device 100 has a communication unit 175. In this embodiment, the communication unit 175 has a communication interface that supports a wireless LAN such as Wi-Fi (trademark registered), or Bluetooth (trademark registered), and is connected to the information processing device 200 via a network 10.

The interface of the communication unit 175 may also be for wired connection such as the Ethernet (trademark registered), IEEE 1394, HDMI (trademark registered), or USB.

The communication unit 175 receives image data from the information processing device 200 connected thereto. The communication unit 175 sends the received image data to an image processing unit 152. The communication unit 175 can also transmit various information data to the information processing device 200 connected thereto.

The projector device 100 has an image projection unit 50 which forms an optical image and projects (displays) the image onto the screen SC. The image projection unit 50 functions as a display unit and includes a light source unit 55 as a light source, a light modulation unit 80, and a projection system 90.

The light source unit 55 is driven by a light source drive unit 121. The light source drive unit 121 is connected to an internal bus 180. The light source drive unit 121 turns on and off the light source of the light source unit 55 under the control of a control unit 160. When the light source is turned on, exit light L1 enters the light modulation unit 80.

A light modulation drive unit 122 which drives a liquid crystal device 85 of the light modulation unit 80 is connected to the light modulation unit 80. The light modulation drive unit 122 is connected to the internal bus 180.

The light modulation drive unit 122 generates each of R, G, B image signals based on display image data inputted from the image processing unit 152. The light modulation drive unit 122 drives the corresponding liquid crystal device (not illustrated) of the light modulation unit 80, based on the generated R, G, B image signals, and causes thus an image to be drawn.

The projection system 90 has a lens group which projects image light L2 resulting from the modulation of the exit light L1 by the light modulation unit 80, into the direction of the screen SC, and thus forms an image on the screen SC. The projection system 90 may also have a zoom mechanism which enlarges and reduces the projection image on the screen SC and adjusts its focal point, and a focusing adjustment mechanism which adjusts the focusing.

The projector device 100 has an operation panel 131 and an operation processing unit 133. The operation processing unit 133 is connected to the internal bus 180.

Various operation keys and a display screen are displayed on the operation panel 131, which accepts an operation by the user. When an operation key displayed on the operation panel 131 is operated, the operation processing unit 133 outputs data corresponding to the operated key to the control unit 160. The operation processing unit 133 also causes the operation panel 131 to display various screens, under the control of the control unit 160.

On the operation panel 131, a touch sensor to detect a touch on the operation panel 131 may be formed in a superimposed and integrated manner. The operation processing unit 133 detects a position on the operation panel 131 touched by the user with a finer or the like, as an input position, and outputs data corresponding to the detected input position to the control unit 160.

The projector device 100 has a status detection unit 140. A signal outputted from a camera 142 built in the projector device 100 is inputted to the status detection unit 140.

The status detection unit 140 generates status information representing the status of the projector device 100, based on the inputted signal, and outputs the status information to the control unit 160.

The camera 142 has an image pickup optical system, an image pickup element such as a CCD, and an interface circuit or the like. The camera 142 captures an image of the surroundings of the screen SC where a projection image is projected, that is, an image in the direction of projection by the projection system 90. The camera 142 outputs image data signal of the captured projection image to the status detection unit 140.

The projector device 100 has an image processing system. The image processing system is configured mainly of the control unit 160, which comprehensively controls the entirety of the projector device 100. The image processing system also includes the image processing unit 152, a frame memory 155, and a storage unit 170. The control unit 160, the image processing unit 152, and the storage unit 170 are connected to the internal bus 180.

The image processing unit 152, under the control of the control unit 160, unfolds image data inputted from the communication unit 175 into the frame memory 155. The image processing unit 152 carries out processing on the image data unfolded in the frame memory 155, such as shape correction processing like keystone correction, digital zoom processing, and adjustment of the color tone and brightness of the image. The image processing unit 152 executes processing designated by the control unit 160, and carries out the processing using a parameter inputted from the control unit 160 according to need. Of course, the image processing unit 152 can also execute a combination of a plurality of kinds, of the foregoing processing.

The image processing unit 152 reads out the processed image data from the frame memory 155 and outputs the read-out image data to the light modulation drive unit 122 as display image data.

The control unit 160 has hardware including a processor such as a CPU (central processing unit), a ROM (read-only memory), and a RAM (random access memory), none of which is illustrated. The control unit 160 may have one or a plurality of processors. The ROM is a non-volatile storage device such as a flash ROM and stores a control program and data. The RAM forms a work area for the processor. The processor unfolds the control program read out from the ROM or the storage unit 170 into the RAM and executes the control program unfolded in the RAM, thus controlling each part of the projector device 100.

The control unit 160 also controls the execution of each function, based on an operation instruction inputted via the operation panel 131.

The control unit 160 has a projection control unit 161 and a correction processing unit 163 as functional blocks. These functional blocks are implemented by the processor and the control program stored in the ROM or the storage unit 170 collaborating with each other, none of which is illustrated.

The storage unit 170 is anon-volatile storage device and implemented, for example, by a storage device such as a flash memory, EPROM (erasable programmable ROM), EEPROM (electrically EPROM), or HDD (hard disk drive). The storage unit 170 stores image data to be projected on the screen SC by the image projection unit 50 and various data and parameters or the like which the control unit 160 refers to.

The projection control unit 161 adjusts the way an image is displayed by the image projection unit 50, and thus controls the projection of the image on the screen SC.

Specifically, the projection control unit 161 controls the image processing unit 152 to execute image processing on image data received by the communication unit 175. At this time, the projection control unit 161 may read out a necessary parameter for the processing by the image processing unit 152 and output the parameter to the image processing unit 152.

The projection control unit 161 also controls the light source drive unit 121 to turn on the light source of the light source unit 55, and gives an instruction of a specific luminance of the light source to the light source unit 55.

The correction processing unit 163 executes correction processed based on status information outputted from the status detection unit 140.

For example, if the status information indicates a tilt of the projector device 100, the correction processing unit 163 instructs the image processing unit 152 to perform keystone correction.

A power supply unit 190 converts electric power supplied from an external power supply 195 into a predetermined characteristic value and supplies the characteristic value to each functional unit.

Functional Configuration of Information Processing Device

Figure 3:
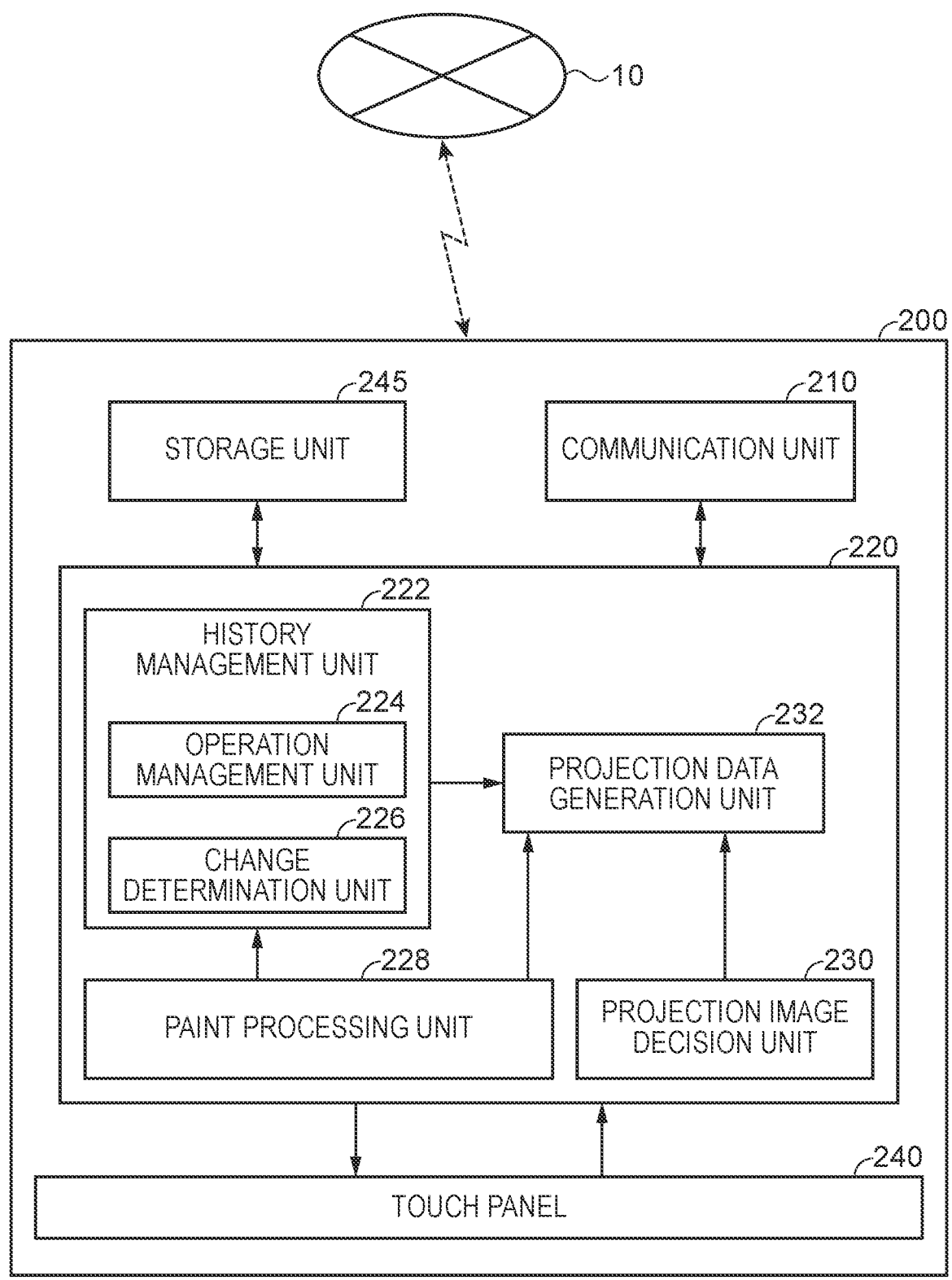
FIG. 3 shows the functional configuration of an information processing device.

FIG. 3 shows the functional configuration of the information processing device 200 connected to the projector device 100.

The information processing device 200 has a communication unit 210, a storage unit 245, a control unit 220, and a touch panel 240.

The communication unit 210 transmits and receives data to and from the projector device 100 via the network 10. For example, the communication unit 210 transmits image data to be projected by the projector device 100.

The storage unit 245 stores content data in a file format representing an image or document, and data of a program executable by the information processing device 200. As an application program, an operation program to operate the projector device 100, a drawing program or the like may be employed. In this embodiment, the storage unit 245 may be, for example, a flash memory or the like.

The touch panel 240 functions as an accepting unit which displays an image (see FIG. 4) including a user interface of various application programs and which accepts an instruction from the user on the displayed image. For example, when a drawing program is executed, the touch panel 240 accepts an operation by the user on a drawn image 272.

The control unit 220 controls the operation of each functional unit of the information processing device 200.

The control unit 220 has a history management unit 222, a paint processing unit 228, a projection image decision unit 230, and a projection data generation unit 232, as functional blocks.

The projection image decision unit 230 decides an image to be projected by the projector device 100. In this embodiment, the projection image decision unit 230 causes the touch panel 240 to display selectable images, and decides an image selected by the user operating the touch panel 240, as an image to be projected. The projection image decision unit 230 sends image data corresponding to the image selected by the user, to the projection data generation unit 232. The image selected by the user is also displayed on the touch panel 240.

The paint processing unit 228 carries out generation of a drawn image 272 on the touch panel 240 and editing including erasure of an image, based on an instruction from the user operating the touch panel 240. The paint processing unit 228 is equivalent to an editing unit. In this embodiment, the drawing program that is being executed provides functions such as a pen, a brush, and an eraser on the user interface, and the user uses these to generate a desired image.

For example, the user selects the pen function and moves a finger FG over a predetermined area of the touch panel 240. This causes the paint processing unit 228 to generate an image of the trajectory of the finger FG drawn with the pen.

Also, the user selects the erasure function and moves the finger FG over the image drawn on the touch panel 240. This causes the paint processing unit 228 to erase the area on the image where the trajectory of the finger FG passes. The paint processing unit 228 sends image data of the generated drawn image 272 to the projection data generation unit 232.

When the user starts editing the drawn image 272 displayed on the touch panel 240, the paint processing unit 228 stores the data of the "image before editing" (first image) displayed on the touch panel 240 into the storage unit 245.

After the user moves the finger FG on the touch panel 240 and designates a certain type of editing, the paint processing unit 228 detects that the finger FG is moved away from the touch panel 240, and thus detects an end of the designation of editing by the user. The paint processing unit 228 sends information indicating the end of the one editing process to the history management unit 222.

The history management unit 222 manages the history of editing processes based on instructions from the user. The history management unit 222 has an operation management unit 224 and a change determination unit 226.

When information indicating the end of the editing process is sent to the change determination unit 226 from the paint processing unit 228, the change determination unit 226 compares the "image before editing" stored in the storage unit 245 with the "image after editing" (second image) displayed on the touch panel 240 after the end of the editing process, and determines whether there is a change, that is, a difference, between the two images or not. In this embodiment, the change determination unit 226 is equivalent to a comparison unit which compares data of the "image before editing" (first image data) with data of the "image after editing" (second image data).

The change determination unit 226 compares image data (compressed data) obtained by compressing the "image before editing" and the "image after editing" by a predetermined compression method. This enables efficient processing and use of time for the comparison. As the predetermined compression method, for example, a lossless compression method such as the PNG (portable network graphics) method may be employed. As such a compression method, the GIF (graphics interchange format) method, TIFF (tag image file format) method or the like may also be employed. As already known, the original data of the data compressed by the lossless compression method can be perfectly restored by decompression (decoding).

The change determination unit 226 first compresses the image data of the "image after editing" and the "image before editing" by the same compression method. If the image data of the "image before editing" has already been compressed, the "image after editing" is compressed by the same compression method as the "image before editing".

The change determination unit 226 then compares the two compressed image data, that is, the compressed data of the "image before editing" (first compressed data) and the compressed data of the "image after editing" (second compressed data), bit by bit, and thus detects a difference between these. The change determination unit 226 determines whether the "image after editing" has been changed from the "image before editing" or not, based on whether a difference is detected or not. The change determination unit 226 sends the result of the determination to the operation management unit 224.

The operation management unit 224 manages the history about operations by the user, based on the result of the determination sent from the change determination unit 226. In this embodiment, the operation management unit 224 is equivalent to a management unit which causes the storage unit 245 to store history information about editing if a difference between two image data is detected.

That is, if it is determined that the "image after editing" has been changed from the "image before editing", the operation management unit 224 causes the storage unit 245 to store history information including the image data obtained by compressing the "image before editing". Meanwhile, if it is determined that the "image after editing" has not been changed from the "image before editing", that is, if it is determined that the "image after editing" displayed on the touch panel 240 and the "image before editing" are the same, the operation management unit 224 does not cause history information to be stored.

When causing the storage unit 245 to store history information including the image data, the operation management unit 224 manages the history information to be stored in the storage unit 245, based on the comparison between the amount of information of the history information stored in the storage unit 245 and a reference amount. In this embodiment, the number of pieces of history information is used as the amount of information. For example, the operation management unit 224 counts the number of data of the history information already stored in the storage unit 245. If the number of data is equal to or below a predetermined reference number, the operation management unit 224 causes the storage unit 245 to store history information.

Meanwhile, if the number of data exceeds the predetermined reference number, the operation management unit 224 erases the history information stored in the storage unit 245 in order from the earliest stored history information, that is, in order from the earliest time and date of storage. This enables the operation management unit 224 to avoid an increase in the data volume stored in the storage unit 245 and efficiently manage the data in the storage unit 245.

The predetermined reference number may be a given number or may be able to be set by the user. The preference reference number may also change according to the storage capacity available in the storage unit 245. The operation management unit 224 may also compare the total volume of data of the history information stored in the storage unit 245, instead of the number of data of the history information stored in the storage unit 245, with a reference volume of data.

The history management unit 222 has the function of canceling drawing operations that have already been done, retrospectively in time series, based on an undo operation by the user. For example, if an undo operation is executed to the "image after editing" that is edited by the user, the history management unit 222 acquires the last image data stored, that is, the image data of the "image before editing", from the history information stored in the storage unit 245, then decompresses the acquired image data, and sends the decompressed image data to the projection data generation unit 232. The control unit 220 also causes the touch panel 240 to display an image based on the decompressed image data.

The projection data generation unit 232 generates image data that can be projected by the projector device 100, based on the image data sent thereto. The projection data generation unit 232 transmits the generated image data to the projector device 100 via the communication unit 210.

When the user operates the touch panel 240 to give an instruction to end the drawing program, the control unit 220 ends the drawing program and erases the data of the history information stored in the storage unit 245.

The control unit 220 may be implemented, for example, by a computer having a processor such as a CPU, a RAM, a ROM and the like, none of which is illustrated. The control unit 220 may have one or a plurality of processors. The computer may have various dedicated processing circuits such as an image processing circuit. The control unit 220 may also be implemented by an ASIC (application specific integrated circuit) or the like. The one or plurality of processors of the control unit 220 reads out and executes a program stored in the storage unit 245, thus implementing the history management unit 222, the paint processing unit 228, the projection image decision unit 230, and the projection data generation unit 232.

FIG. 4 shows an example of the user interface screen 250 of the drawing program displayed on the touch panel 240.

An image display area is provided at a center part of the user interface screen 250. In this image display area, a display image 270 that is the same as the projection image projected by the projector device 100 is displayed.

The display image 270 includes a scenery image 274 decided by the projection image decision unit 230 and a drawn image 272 drawn by the user with a pen and superimposed on the scenery image 274.

An operation area is provided below the user interface screen 250. In the operation area, a pen button 252, an eraser button 254, a setting button 256, a back button 258, and a forward button 260 are displayed.

A press of the pen button 252 causes the pen function to start up to draw the drawn image 272. A press of the eraser button 254 causes the erasure function to start up to erase the drawn image 272. A press of the setting button 256 causes the setting function to start up with respect to the pen function and the erasure function, such as the thickness of the pen or the size of the eraser.

A press of the back button 258 causes an undo operation to be executed with respect to an operation by the user. A press of the forward button 260 causes a redo operation to be executed with respect to an undo operation.

Figure 5:
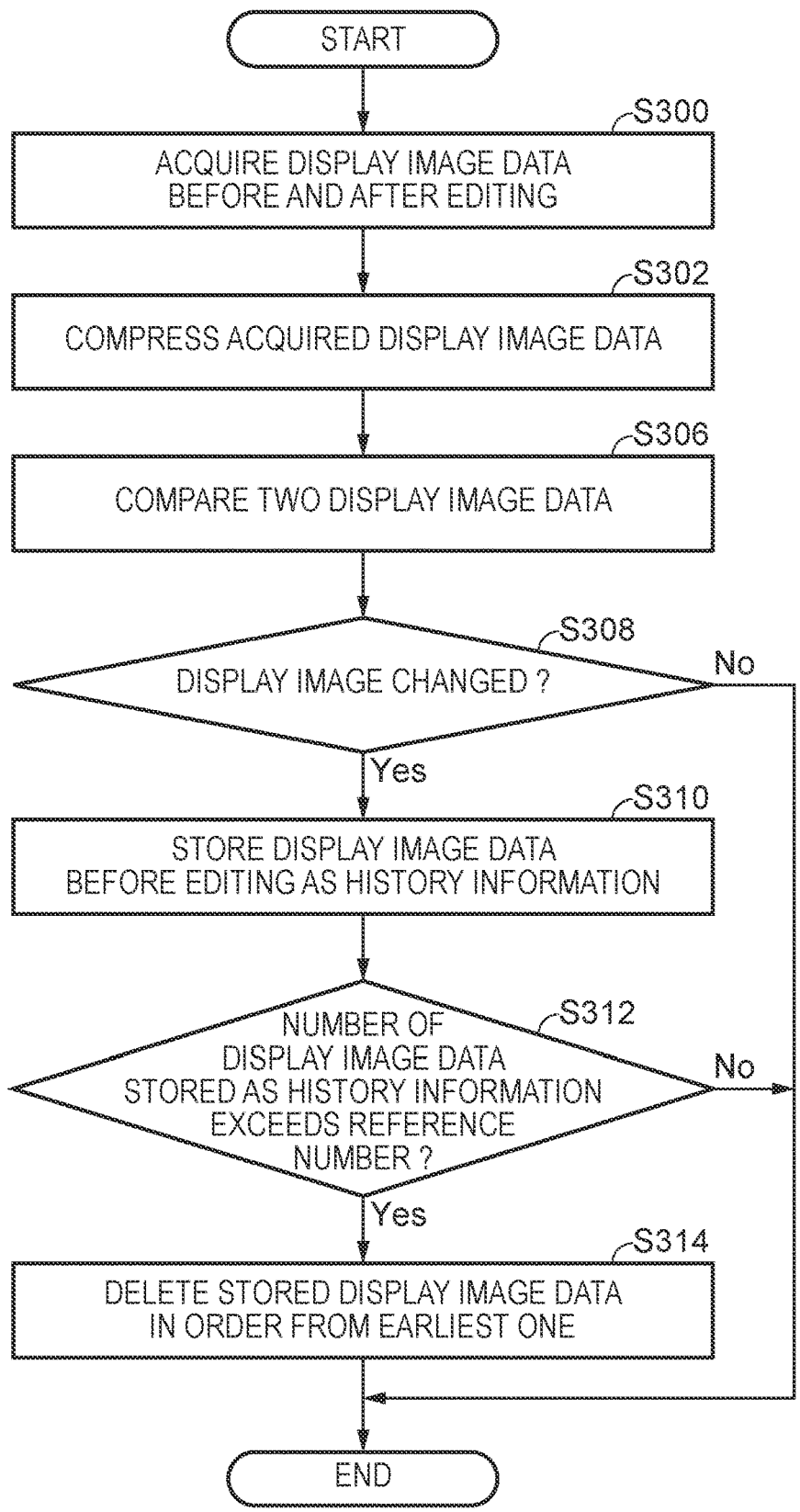
FIG. 5 is a flowchart showing a flow of history management processing.

FIG. 5 is a flowchart showing the flow of a history management processing method (control method) by the control unit 220. This history management processing is executed if the end of one editing process is determined.

As this processing is started, the control unit 220 acquires display image data before and after editing (step S300).

Next, the control unit 220 compresses each of the acquired display image data by a predetermined compression method (step S302).

Next, the control unit 220 compares the two compressed display image data (step S306).

Next, the control unit 220 determines whether the "image after editing" has been changed from the "image before editing" or not, based on the result of the comparison of the two display image data (step S308).

If the control unit 220 determines that the "image after editing" has not been changed from the "image before editing" (No in step S308), the control unit 220 ends the processing.

Meanwhile, if the control unit 220 determines that the "image after editing" has been changed from the "image before editing" (Yes in step S308), the control unit 220 stores history information including the display image data before editing, into the storage unit 245 (step S310).

Next, the control unit 220 counts the number of display image data as history information stored in the storage unit 245 and determines whether the number of display image data exceeds a reference number or not (step S312).

If the control unit 220 determines that the number of display image data does not exceed the reference number (No in step S312), the control unit 220 ends the processing.

Meanwhile, if the control unit 220 determines that the number of display image data exceeds the reference number (Yes in step S312), the control unit 220 deletes the image data stored in the storage unit 245 in order from the earliest date and time of creation (step S314) and ends the processing.

FIG. 6 shows an example of editing processing based on a drawing program carried out on the display image 270 displayed on the touch panel 240.

First, a display image 270A shows a state where the drawn image 272 has been drawn on the scenery image 274 by the pen function. If the control unit 220 detects the end of the drawing of the drawn image 272, the control unit 220 stores the image data of the display image 270A in the storage unit 245. At this point, the user selects the erasure function and moves the finger FG, thus starting to erase the drawn image 272.

Next, a display image 270B shows a state where the user has erased a part of the drawn image 272 by moving the finger FG from a start point P1 to an endpoint P2 as the erasure function. In response to the end of one editing process, the control unit 220 compresses the image data of the display image 270B, which is an "image after editing". The control unit 220 also compresses the image data of the display image 270A stored in the storage unit 245.

The control unit 220 compares the two compressed image data. As a result of the comparison, the control unit 220 determines that the display image 270B has been changed from the display image 270A. Therefore, the control unit 220, stores the compressed image data of the display image 270A in the storage unit 245 as history information.

Next, a display image 270C shows a state where the user has ended one editing process by moving the finger FG from a start point P3 to an end point P4 as the erasure function. In this case, the trajectory from the start point P3 to the end point P4 does not overlap the drawn image 272 and therefore does not erase any part of the drawn image 272.

In response to the end of one editing process, the control unit 220 compresses the image data of the display image 270C, which is an "image after editing". The control unit 220 also compresses the image data of the display image 270B stored in the storage unit 245.

The control unit 220 compares the two compressed image data. As a result of the comparison, the control unit 220 determines that the display image 270C has not been changed from the display image 270B. Therefore, the control unit 220 does not store the image data of the display image 270B as history information.

Next, a display image 270D shows a state where the user has ended one editing process by moving the finger FG from a start point P5 to an end point P6 as the erasure function. As in the case of the display image 270C, the trajectory from the start point P5 to the end point P6 does not overlap the drawn image 272. Therefore, the image data of the display image 270C is not stored as history information.

Next, a display image 270E shows a state where the user has erased another part of the drawn image 272 by moving the finger FG from a start point P7 to an end point P8 as the erasure function. In response to the end of one editing process, the control unit 220 compresses the image data of the display image 270E, which is an "image after editing". The control unit 220 also compresses the image data of the display image 270D stored in the storage unit 245.

The control unit 220 compares the two compressed image data. As a result of the comparison, the control unit 220 determines that the display image 270E has been changed from the display image 270D. Therefore, the control unit 220 stores the compressed image data of the display image 270D in the storage unit 245 as history information.

At this point, if the user presses the back button 258 on the user interface screen 250, the control unit 220 detects the pressing of the back button 258 and executes an undo operation. The control unit 220 acquires the last image stored as history information, that is, the image data of the display image 270D from the storage unit 245, decompresses the acquired image data, and then causes the display image 270D to be displayed on the touch panel 240 instead of the display image 270E. The control unit 220 also sends the image data of the display image 270D to the projector device 100. The projector device 100 projects the display image 270D on the screen SC.

If the user presses the back button 258 once again, the control unit 220 executes an undo operation. That is, the control unit 220 acquires the image data of the display image 270A stored as history information immediately before the display image 270D, from the history information in the storage unit 245, decompresses the acquired image data, and then causes the display image 270A to be displayed on the touch panel 240 instead of the display image 270D. The control unit 220 also sends the image data of the display image 270A to the projector device 100. The projector device 100 projects the display image 270A on the screen SC.

It is preferable that, when executing an undo operation, the control unit 220 stores the display image 270E displayed on the touch panel 240 into the storage unit 245. This enables the user to go back to the state where the display image 270E is displayed on the touch panel 240, when giving an instruction to cancel the undo operations with redo operations.

The embodiment has the following advantageous effects.

(1) If the information processing device 200 detects a difference between an "image after editing" and an "image before editing" by comparing these, the information processing device 200 stores history information about editing. Since the history information is stored when an image is changed by editing, a history operation based on the history information such as a return operation can be efficiently carried out.

(2) The information processing device 200 stores history information in the storage unit 245 without exceeding a reference number. Therefore, the storage resource of the storage unit 245 can be efficiently used.

(3) The information processing device 200 compresses image data of an "image before editing" and an "image after editing" by a lossless compression method such as the PNG method and compares these image data with the data volume thus reduced. Therefore, processing required for the comparison can be carried out swiftly. Also, with the compression by a lossless compression method, the information processing device 200 can restore the "image before editing" that is before compression, from history information.

While the invention has been described, based on the illustrated embodiment, the invention is not limited to the embodiment. The following modifications may also be employed.

(1) The compression processing by the information processing device 200 may use both of a lossless compression method and a lossy compression method. In this case, the JPEG (joint photographic experts group) method or the like can be employed as a lossy compression method. If the information processing device 200 detects a difference as a result of comparing two images compressed by a lossy compression method, the information processing device 200 may compress the "image before editing" by a lossless compression method and store the compressed image as history information. Generally, compressing data by a lossless compression method requires a longer time and more resources than compressing data by a lossy compression method. Therefore, by compressing image data by a lossy compression method when comparing images, and compressing image data by a lossless compression method only when storing the image as history information, it is possible to reduce the load required for the processing by the information processing device 200.

(2) A configuration can be employed in which the change determination unit 226 compares two compressed image data, counts the number of differences, and determines that there is no change between the two images if the number of differences does not exceed a predetermined reference number, thus not storing the image data as history information. Thus, a determination error can be avoided in the case where a code error on a bit basis has occurred, or the like.

(3) While the change determination unit 226 compares two image data bit by bit and detects a difference, the change determination unit 226 is not limited to this method. For example, the change determination unit 226 may calculate a hash value for each of image data by applying a known hash function to the image data, then compare the calculated hash values, and thus determine whether there is a difference between the two image data. This can speed up the determination on a change in the image due to editing.

(4) While the control unit 220 compresses each of acquired display image data by a predetermined compression method and compares the two compressed display image data, a configuration in which the control unit 220 compares the acquired display image data without compression can be employed as well.

The device carrying out techniques as described above may be implemented by a single device or may be implemented by a combination of a plurality of devices, and may include various configurations.

The entire disclosure of Japanese Patent Application No. 2017-106274, filed May 30, 2017 is expressly incorporated by reference herein.

What is claimed is:

1. A method for controlling an information processing device, the method comprising:
   detecting a user input for an operation on an input panel;
   accepting the operation on a first image;
   digitally editing the first image, based on the accepted operation;
   comparing first image data representing the first image with second image data representing a second image obtained by editing the first image; and
   storing history information about the editing if a difference between the first image data and the second image data is detected as a result of the comparison, wherein
   the first image data is compressed by a predetermined compression method to generate first compressed data, the second image data is compressed by the predetermined compression method to generate second compressed data, and the first compressed data is compared with the second compressed data.

2. The method for controlling an information processing device according to claim 1, wherein
   the history information is erased in order from the earliest stored history information, if an amount of information of the stored history information exceeds a reference amount.

3. The method for controlling an information processing device according to claim 1, wherein
   the predetermined compression method is a lossless compression method.

4. The method for controlling an information processing device according to claim 3, wherein
   the history information includes the first compressed data compressed by the lossless compression method.

5. The method for controlling an information processing device according to claim 1, wherein
   the first image data and the second image data are compressed by a lossy compression method, the first compressed data and the second compressed data thus compressed are compared with each other, the first image data is compressed by a lossless compression method if the difference is detected as a result of the comparison, and the history information including the first compressed data compressed by the lossless compression method is stored.

6. The method for controlling an information processing device according to claim 1, wherein
   the first image data and the second image data are transmitted to a display device.

7. An information processing device comprising:
   a sensor that detects a user input for an operation on an input panel;
   an accepting unit which accepts the operation on a first image;
   an editing unit which digitally edits the first image, based on the accepted operation;
   a storage unit which stores history information about the editing;
   a comparison unit which compares first image data representing the first image with second image data representing a second image obtained by editing the first image; and
   a management unit which causes the storage unit to store the history information if the comparison unit detects a difference between the first image data and the second image data, wherein
   the comparison unit compresses the first image data by a predetermined compression method to generate first compressed data, compresses the second image data by the predetermined compression method to generate second compressed data, and compares the first compressed data with the second compressed data.

8. The information processing device according to claim 7, wherein
   the management unit erases the history information in order from the earliest stored history information, if an amount of information of the history information stored in the storage unit exceeds a reference amount.

9. The information processing device according to claim 7, wherein
   the predetermined compression method is a lossless compression method.

10. The information processing device according to claim 9, wherein
    the history information includes the first compressed data compressed by the lossless compression method.

11. The information processing device according to claim 7, wherein
    the comparison unit compresses the first image data and the second image data by a lossy compression method, compares the first compressed data and the second compressed data thus compressed, compresses the first image data by a lossless compression method if the difference is detected as a result of the comparison, and stores the history information including the first compressed data compressed by the lossless compression method.

12. The information processing device according to claim 7, further comprising
    a communication unit which transmits the first image data and the second image data to a display device.

* * * * *